United States Patent
Cheong et al.

(10) Patent No.: US 7,343,523 B2
(45) Date of Patent: Mar. 11, 2008

(54) WEB-BASED ANALYSIS OF DEFECTIVE COMPUTER PROGRAMS

(75) Inventors: I. L. Gerald Cheong, Sunnyvale, CA (US); Dong Xu, Beijing (CN)

(73) Assignee: Aristoga, Inc., Sunnyvale, CA (US)

( * ) Notice: Subject to any disclaimer, the term of this patent is extended or adjusted under 35 U.S.C. 154(b) by 551 days.

(21) Appl. No.: 11/057,980

(22) Filed: Feb. 14, 2005

(65) Prior Publication Data

US 2006/0184829 A1    Aug. 17, 2006

(51) Int. Cl.
    *G06F 11/00* (2006.01)
(52) U.S. Cl. .......................................... 714/38; 717/130
(58) Field of Classification Search ................. 714/38; 717/130
    See application file for complete search history.

(56) References Cited

U.S. PATENT DOCUMENTS

| | | | |
|---|---|---|---|
| 3,763,474 A * | 10/1973 | Freeman et al. ............... 714/38 |
| 5,193,180 A | 3/1993 | Hastings |
| 5,265,254 A | 11/1993 | Blasciak et al. |
| 5,274,811 A | 12/1993 | Borg et al. |
| 5,313,616 A | 5/1994 | Cline et al. |
| 5,408,650 A | 4/1995 | Arsenault |
| 5,581,696 A | 12/1996 | Kolawa et al. |
| 5,590,056 A | 12/1996 | Barritz |
| 5,815,653 A | 9/1998 | You et al. |
| 5,854,924 A * | 12/1998 | Rickel et al. ................ 717/132 |
| 6,016,556 A * | 1/2000 | Heath ........................... 714/38 |
| 6,052,525 A * | 4/2000 | Carlson et al. ............. 717/100 |
| 6,170,065 B1 * | 1/2001 | Kobata et al. .................. 714/7 |
| 6,202,199 B1 | 3/2001 | Wygodny et al. |
| 6,282,701 B1 * | 8/2001 | Wygodny et al. ........... 717/125 |
| 6,353,924 B1 * | 3/2002 | Ayers et al. ................. 717/128 |
| 6,393,490 B1 * | 5/2002 | Stiles et al. ................. 719/313 |
| 6,457,142 B1 | 9/2002 | Klemm et al. |
| 6,601,188 B1 * | 7/2003 | Wilding ....................... 714/15 |
| 6,751,794 B1 * | 6/2004 | McCaleb et al. ........... 717/168 |
| 6,804,814 B1 | 10/2004 | Ayers et al. |
| 2002/0032802 A1 * | 3/2002 | Stiles et al. ................. 709/310 |
| 2002/0116665 A1 * | 8/2002 | Pickover et al. .............. 714/38 |
| 2002/0178401 A1 * | 11/2002 | Ball et al. ..................... 714/38 |
| 2005/0166095 A1 * | 7/2005 | Chander et al. .............. 714/38 |
| 2005/0229045 A1 * | 10/2005 | Tamakoshi ................... 714/38 |
| 2005/0235007 A1 * | 10/2005 | Abali et al. ................. 707/202 |
| 2006/0048129 A1 * | 3/2006 | Napier et al. ............... 717/168 |
| 2006/0143533 A1 * | 6/2006 | Dresser et al. ................ 714/38 |
| 2007/0038982 A1 * | 2/2007 | Andrews et al. ............ 717/124 |

* cited by examiner

*Primary Examiner*—Bryce P Bonzo
(74) *Attorney, Agent, or Firm*—Morgan, Lewis & Bockius LLP

(57) ABSTRACT

A method and system for web-based analysis of defective computer programs is disclosed. One aspect of the invention involves a method at a third-party computer remote from a customer computer with a defective program and remote from a set of computers associated with a support provider for the defective program. The method involves receiving log data and program code associated with the log data that was collected from the defective program on the customer computer; decompiling the program code if the program code is not already decompiled; and providing analysis of the received log data and the decompiled program code to a network application in communication with the third-party computer.

20 Claims, 9 Drawing Sheets

Figure 7

```
<Jback-log-data>
<entry tag="1" TimeStamp="1" PackageName="com.yysoft.JBack.demo"
ClassName="HelloWorld" MethodName="main" MethodSignature="class
[Ljava.lang.String;," ReturnType="void"><param type="class [Ljava.lang.String;"
value="[Ljava.lang.String;@1632847"/></entry>
<entry tag="1" TimeStamp="2" PackageName="com.yysoft.JBack.demo"
ClassName="HelloWorld" MethodName="greet" MethodSignature="" ReturnType="void"/>
<entry tag="1" TimeStamp="3" PackageName="com.yysoft.JBack.demo"
ClassName="HelloWorld" MethodName="foo" MethodSignature="" ReturnType="void"/>
<entry tag="2" TimeStamp="4" PackageName="com.yysoft.JBack.demo"
ClassName="HelloWorld" MethodName="foo" MethodSignature="" ReturnType="void"
ReturnValue="null"/>
<entry tag="1" TimeStamp="5" PackageName="com.yysoft.JBack.demo"
ClassName="HelloWorld" MethodName="foo2" MethodSignature="int,"
ReturnType="void"><param type="int" value="1"/></entry>
<entry tag="2" TimeStamp="6" PackageName="com.yysoft.JBack.demo"
ClassName="HelloWorld" MethodName="foo2" MethodSignature="int," ReturnType="void"
ReturnValue="null"><param type="int"/></entry>
<entry tag="2" TimeStamp="7" PackageName="com.yysoft.JBack.demo"
ClassName="HelloWorld" MethodName="greet" MethodSignature="" ReturnType="void"
ReturnValue="null"/>
<entry tag="1" TimeStamp="8" PackageName="com.yysoft.JBack.demo"
ClassName="HelloWorld" MethodName="greet" MethodSignature="" ReturnType="void"/>
<entry tag="1" TimeStamp="9" PackageName="com.yysoft.JBack.demo"
ClassName="HelloWorld" MethodName="foo" MethodSignature="" ReturnType="void"/>
<entry tag="1" TimeStamp="10" PackageName="com.yysoft.JBack.demo"
ClassName="HelloWorld" MethodName="foo" MethodSignature="" ReturnType="void"
ReturnValue="null"/>
<entry tag="2" TimeStamp="11" PackageName="com.yysoft.JBack.demo"
ClassName="HelloWorld" MethodName="greet" MethodSignature="" ReturnType="void"
ReturnValue="null"/>
<entry tag="1" TimeStamp="12" PackageName="com.yysoft.JBack.demo"
ClassName="HelloWorld" MethodName="greet" MethodSignature="" ReturnType="void"/>
<entry tag="1" TimeStamp="13" PackageName="com.yysoft.JBack.demo"
ClassName="HelloWorld" MethodName="foo2" MethodSignature="int,"
ReturnType="void"><param type="int" value="3"/></entry>
<entry tag="2" TimeStamp="14" PackageName="com.yysoft.JBack.demo"
ClassName="HelloWorld" MethodName="foo2" MethodSignature="int," ReturnType="void"
ReturnValue="null"><param type="int"/></entry>
<entry tag="1" TimeStamp="15" PackageName="com.yysoft.JBack.demo"
ClassName="HelloWorld" MethodName="greet" MethodSignature="" ReturnType="void"
ReturnValue="null"/>
<entry tag="1" TimeStamp="16" PackageName="com.yysoft.JBack.demo"
ClassName="HelloWorld" MethodName="greet" MethodSignature="" ReturnType="void"/>
<entry tag="1" TimeStamp="17" PackageName="com.yysoft.JBack.demo"
ClassName="HelloWorld" MethodName="foo" MethodSignature="" ReturnType="void"/>
<entry tag="2" TimeStamp="18" PackageName="com.yysoft.JBack.demo"
ClassName="HelloWorld" MethodName="foo" MethodSignature="" ReturnType="void"
ReturnValue="null"/>
<entry tag="2" TimeStamp="19" PackageName="com.yysoft.JBack.demo"
ClassName="HelloWorld" MethodName="greet" MethodSignature="" ReturnType="void"
ReturnValue="null"/>
<entry tag="1" TimeStamp="20" PackageName="com.yysoft.JBack.demo"
ClassName="HelloWorld" MethodName="greet" MethodSignature="" ReturnType="void"/>
<entry tag="1" TimeStamp="21" PackageName="com.yysoft.JBack.demo"
ClassName="HelloWorld" MethodName="foo" MethodSignature="" ReturnType="void"/>
<entry tag="2" TimeStamp="22" PackageName="com.yysoft.JBack.demo"
ClassName="HelloWorld" MethodName="foo" MethodSignature="" ReturnType="void"
ReturnValue="null"/>
<entry tag="1" TimeStamp="23" PackageName="com.yysoft.JBack.demo"
ClassName="HelloWorld" MethodName="foo2" MethodSignature="int,"
ReturnType="void"><param type="int" value="5"/></entry>
. . .
</Jback-log-data>
```

WEB-BASED ANALYSIS OF DEFECTIVE COMPUTER PROGRAMS

TECHNICAL FIELD

The disclosed embodiments relate generally to the analysis and debugging of computer programs. More particularly, the disclosed embodiments relate to methods and systems for web-based analysis of defective computer programs.

BACKGROUND

Most of the time and money spent on an information technology (IT) system goes towards repairing and maintaining the system, rather than the initial purchase of the system. In particular, the costs of supporting and maintaining the software used in an IT system increase as the complexity of the software increases. Thus, there is a need to develop methods and systems that can analyze software programs and help identify software defects in a timely, cost-effective manner.

There have been previous attempts to improve the efficiency of software analysis. For example, U.S. Pat. No. 6,202,199 describes a system and method for remotely analyzing the execution of computer programs. The system enables a software program running on a user's computer to be monitored and then analyzed by a computer associated with the developer of the software program.

In the system and method described in U.S. Pat. No. 6,202,199, software analysis programs are installed and maintained on each software developer computer that is used to analyze software running on the user's computer. In addition, the only data collected at the user's computer is execution trace information, so a person debugging a defective software program must obtain a copy of the source code or relevant portions thereof by some other means. The need to give the person debugging the software access to the source code raises security concerns as well.

Thus, it would be highly desirable to reduce or eliminate one or more of these problems to provide simpler, less cumbersome, yet advanced software analysis capabilities.

SUMMARY

The present invention overcomes the limitations and disadvantages described above.

One aspect of the invention involves a method of receiving a configuration file at a customer computer; loading the configuration file into a software data collection program on the customer computer; using the software data collection program, collecting log data and program code associated with the log data from a defective program on the customer computer; and sending at least part of the collected log data and the program code to a remote computer that is separate from computers controlled by a support provider for the defective program. The remote computer is configured to provide analysis of the sent collected log data and the program code to a network application in communication with the remote computer.

Another aspect of the invention involves a customer computer that is configured to receive a configuration file; load the configuration file into a software data collection program on the customer computer; using the software data collection program, collect log data and program code associated with the log data from a defective program on the customer computer; and send at least part of the collected log data and the program code to a remote computer that is separate from computers controlled by a support provider for the defective program. The remote computer is configured to provide analysis of the sent collected log data and the program code to a network application in communication with the remote computer.

Another aspect of the invention involves a method at a third-party computer remote from a customer computer with a defective program and remote from a set of computers associated with a support provider for the defective program. The method involves receiving log data and program code associated with the log data that was collected from the defective program on the customer computer; decompiling the program code if the program code is not already decompiled; and providing analysis of the received log data and the decompiled program code to a network application in communication with the third-party computer.

Another aspect of the invention involves a system comprising at least one third-party computer remote from a customer computer with a defective program and remote from a set of computers associated with a support provider for the defective program. The third-party computer is configured to receive log data and program code associated with the log data that was collected from the defective program on the customer computer; decompile the program code if the program code is not already decompiled; and provide analysis of the received log data and the decompiled program code to a network application in communication with the third-party computer.

Another aspect of the invention involves a machine readable medium having stored thereon data representing sequences of instructions, which when executed by a third-party computer remote from a customer computer with a defective program and remote from a set of computers associated with a support provider for the defective program, cause the third-party computer to receive log data and program code associated with the log data that was collected from the defective program on the customer computer; decompile the program code if the program code is not already decompiled; and provide analysis of the received log data and the decompiled program code to a network application in communication with the third-party computer.

Another aspect of the invention involves a system comprising at least one third-party computer remote from a customer computer with a defective program and remote from a set of computers associated with a support provider for the defective program. The system includes means for receiving log data and program code associated with the log data that was collected from the defective program on the customer computer; means for decompiling the program code if the program code is not already decompiled; and means for providing analysis of the received log data and the decompiled program code to a network application in communication with the third-party computer.

Another aspect of the invention involves a method at a computer associated with a support provider for a defective program remote from a third-party computer. The method involves using a network application to access and direct the analysis of log data and program code at the third-party computer. A software analysis program on a customer computer collected the log data and the program code from the defective program on the customer computer.

Another aspect of the invention involves a system comprising a computer associated with a support provider for a defective program remote from a third-party computer. The computer associated with the support provider for the defective program is configured to use a network application to access and direct the analysis of log data and program code at the third-party computer. A software analysis program on a customer computer collected the log data and the program code from the defective program on the customer computer.

Thus, the invention reduces or eliminates the problems described above with respect to analyzing defective software programs in a timely, cost-effective manner. Web-based analysis tools/programs eliminate the need to have such software installed and maintained on each software support provider computer that is used to analyze software running on the customer computer. In addition, by collecting from a customer computer both log data and program code associated with the log data, a person debugging a defective software program is not required to obtain a copy of the source code or relevant portions thereof by some other means. The person debugging the software can use the decompiled program code to analyze the defective software program, rather than the actual source code. Of course, the person analyzing the software can be given access to the actual source code as well.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 7 shows an example of unstructured log data.

DESCRIPTION OF EMBODIMENTS

Web-based methods and systems are described that show how to improve the analysis of defective computer programs. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, applications, components, and networks that are well-known to those of ordinary skill in the art are not described in detail to avoid obscuring aspects of the present invention.

Figure 1:
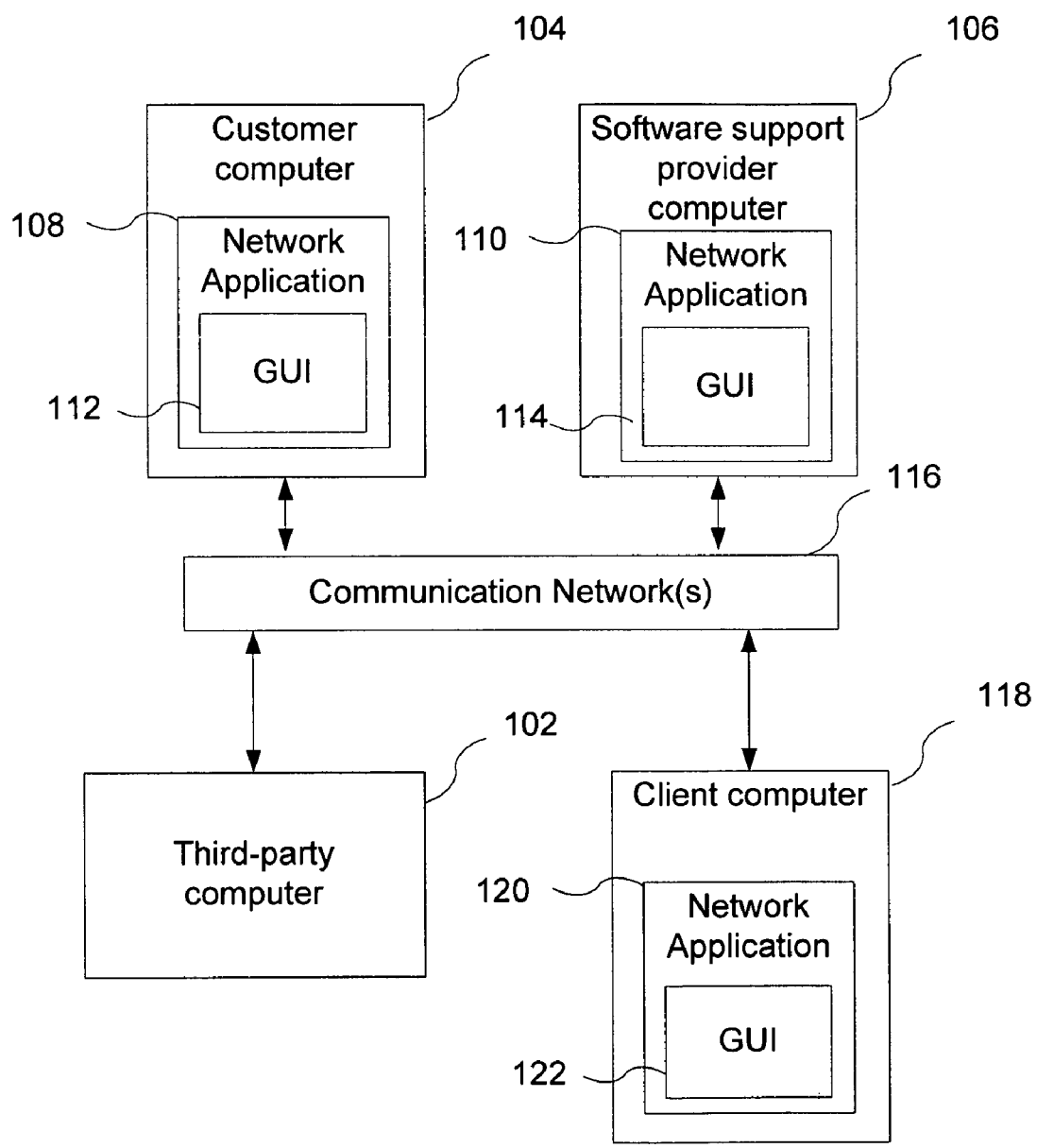
FIG. 1 is a block diagram illustrating an exemplary distributed computer system according to one embodiment of the invention.
Figure 2:
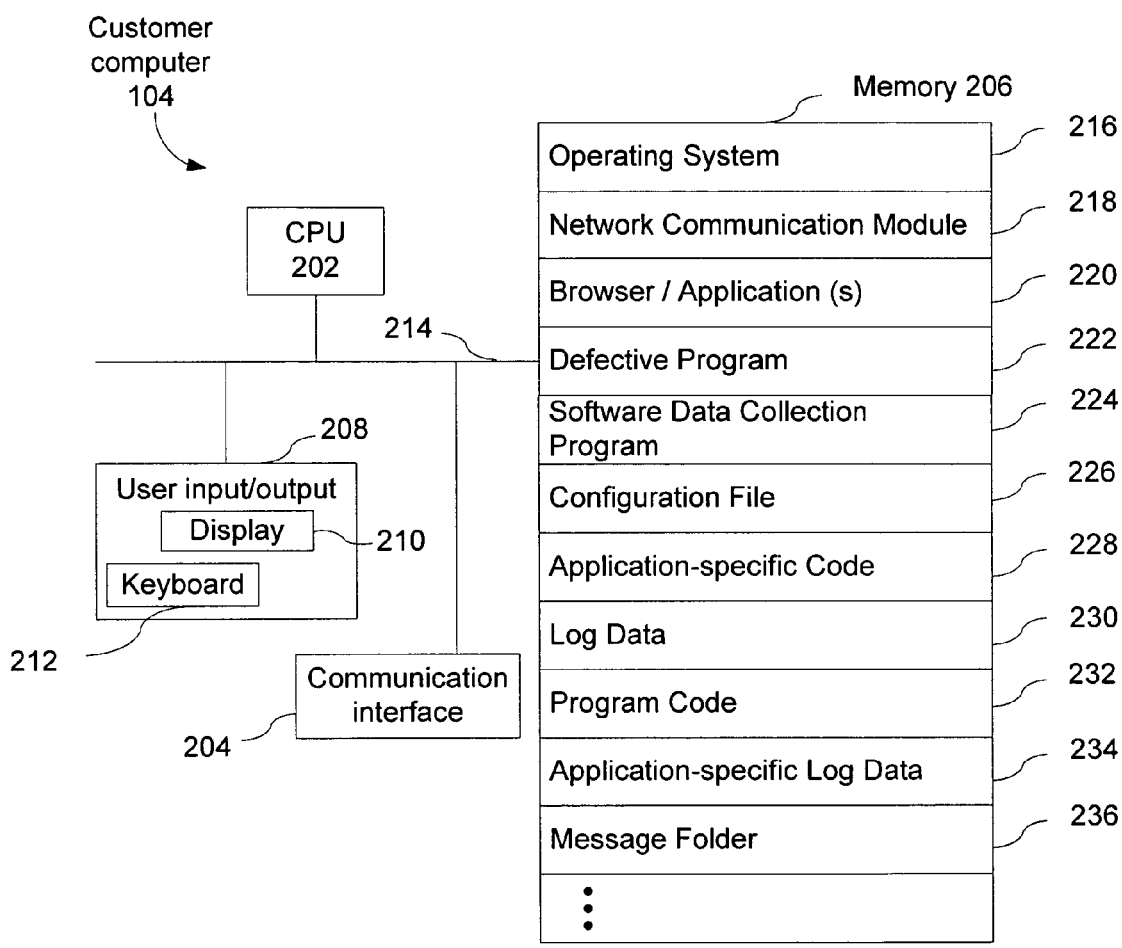
FIG. 2 is a block diagram illustrating a customer computer in accordance with one embodiment of the present invention.

FIG. 1 is a block diagram illustrating an exemplary distributed computer system according to one embodiment of the invention. This system includes customer computer 104, software support provider computer 106, third-party computer 102, and communication network(s) 116 (e.g., the Internet) for interconnecting these components. In some embodiments, customer computer 104 includes network application 108 and graphical user interface (GUI) 112. As used herein, a network application is a network-connected (e.g., Internet-connected) software application with its own user interface (e.g., a web browser application, an email application, a peer-to-peer transfer application, or an instant messaging application). Referring to FIGS. 1 and 2, customer computer 104 is configured to receive a configuration file 226 and load it into a software data collection program 224. Using the software data collection program, customer computer 104 collects log data 230 and program code 232 associated with the log data from a defective program 222 on the customer computer. Customer computer 104 sends at least part of the collected log data and the program code to third-party computer 102 that is separate from software support provider computer 106. Third-party computer 102 is configured to receive the log data 230 and program code 232, and decompile the program code if the program code is not already decompiled (e.g., by customer computer 104). In some embodiments, third-party computer 102 is configured to send information about how to access the log data and program code at the third-party computer to a computer in the set of computers associated with the support provider for the defective software (e.g., software support provider computer 106). Third-party computer 102 provides analysis of the received log data 230 and the decompiled program code 232 to a network application in communication with the third-party computer (e.g., network application 110 in software support provider computer 106 or, more generally, to any network application 120 on a client computer 118 that is given access permission to view and direct the analysis of data associated with the defective program 222). Examples of data associated with a defective program include log data 230, binary (i.e., compiled) or decompiled program code 232, and application-specific log data 234. Software support provider computer 106 includes network application 110 and GUI 114. In some embodiments, software support provider computer 106 is configured to receive information about how to access the log data 230 and program code 232 at the third-party computer. Software support provider computer 106 uses network application 110 to access and direct the analysis of log data 230 and program code 232 at third-party computer 102.

FIG. 2 is a block diagram illustrating customer computer 104 in accordance with one embodiment of the present invention. In some cases, customer computer 104 and software support provider computer 106 belong to two different entities, such as a customer with defective program 222 on customer computer 104 and a software developer with one or more software support computers 106 that provide support/maintenance for defective program 222. In other cases, customer computer 104 and software support provider computer 106 belong to the same entity, such as a software company that develops and provides internal support for defective software program 222.

Customer computer 104 typically includes one or more processing units (CPU's) 202, one or more network or other communications interfaces 204, memory 206, and one or more communication buses 214 for interconnecting these components. Customer computer 104 optionally may include a user interface 208 comprising a display device 210 and a keyboard 212. Memory 206 may include high-speed random access memory and may also include non-volatile memory, such as one or more magnetic disk storage devices. Memory 206 may optionally include one or more storage devices remotely located from the CPU(s) 202. In some embodiments, the memory 206 stores the following programs, modules and data structures, or a subset or superset thereof:

- an operating system 216 that includes procedures for handling various basic system services and for performing hardware dependent tasks;
- a communication module 218 that is used for connecting customer computer 104 to other computers (e.g., third-party computer 102) via one or more communication interfaces 204 (wired or wireless), which in turn connect customer computer 104 to one or more communications networks such as the Internet, other wide area networks, local area networks, metropolitan area networks, and so on;
- a browser and other applications 220 for performing various tasks (e.g., email);
- a defective program 222 that is not working properly;
- a software data collection program 224 that collects log data 230 and program code 232 associated with the log data from defective program 222;
- a configuration file 226 that determines what log data 230 and program code 232 will be collected by software data collection program 224 from defective program 222;
- optional application-specific code 228 (also herein called a plugin program) that determines what application-specific log data 234 will be collected by software data collection program 224 from defective program 222; and
- a message folder 236 in a non-volatile storage device (e.g., a disk drive) that stores log data 230, program code 232 (either compiled or decompiled), and application-specific log information 234 prior to sending the information in the message folder to third-party computer 102.

As used herein, a defective program (e.g., 222) is a program that is not operating properly, independent of the cause of the improper operation. In some cases, the program is not operating properly because of a defect in the program itself. In other cases, the program is not operating properly for some other reason (e.g., the program is not configured properly, or the program is improperly used) or the program is operating correctly but a user incorrectly believes that the program is defective (e.g., due to a misunderstanding about the program's operation).

The collected program code 232 may be binary code (sometimes called compiled code) from the defective program, or decompiled program code produced by decompilation of binary code from the defective program. The decompilation may be performed either at third-party computer 102 or customer computer 104, depending on the embodiment.

In some embodiments, configuration file 226 may include the following information:

- product information, such as the name, version, operating system, and/or website of defective program 222;
- company information, such as the name, address, website, and telephone number of the company that provided defective software program 222;
- related people information, such as an email list of people to notify about the status of defective program 222 (e.g., the customer and the quality assurance, software support, and/or software development engineers at the company that provided defective program 222);
- log settings information, which instructs software data collection program 224 where to acquire log data 230 and associated program code 232 from defective program 222;
- stack trace log settings information, which instructs software data collection program 224 where to acquire log data 230 with run-time stack trace information from defective program 222; and
- optionally, application-specific code 228, sometimes called a plugin, for software data collection program 224 that customizes data collected from defective program 222.

Table 1 illustrates code for an exemplary configuration file 226

TABLE 1

An exemplary configuration file

```
<!--product information -->
<param name="ProductName" value="ABC-Program" />
<param name="ProductVersion" value="1.0" />
<param name="ProductWebsite" value="http://www.abcdefgh.com" />
<!--company information -->
<param name="CompanyName" value="ABC-Provider" />
<param name="CompanyAddress" value="Beijing China" />
<param name="CompanyWebsite" value="http://www.abcdefgh.com" />
<param name="CompanyPhone" value="12345678" />
<!—related people email list -->
<param name="EmailList" value="xxxx@abcdefgh.com;yyyy@abcdefgh.com;zzzz@abcdefgh.com" />
<!-- application-specific code / plugin -->
<param name="UserObjectWrapper" value="com.yysoft.JBack.plugin.HumanObjectWrapper" />
<!--log file -->
<param name="LogFile" value="Z:/JBack-release/JBack-data/petstore/1.0/Log-File-Name.xml" />
```

TABLE 1-continued

An exemplary configuration file

```
<!--trace control information-->
< tracepoints name="TargetMethods">
execution(* com.yysoft.JBack.demo..*(..))
</ tracepoints >
```

In some embodiments, the points to be monitored inside defective program 222 are defined using wildcards, regular expressions, or other similar patterns. In some embodiments, an execution point is monitored by having a dynamic linker load an alternate, instrumented copy of the defective program into memory. However, those of ordinary skill in the art will recognize that other methods that monitor the unmodified defective program 222 can be used.

Table 2 illustrates exemplary application-specific code 228 for a defective program 222.

TABLE 2

Exemplary application-specific code for a defective program

```
package com.yysoft.JBack.plugin;
import com.yysoft.JBack.demo.entity.Human;
import com.yysoft.JBack.engine.UserObjectWrapper;
public class HumanObjectWrapper extends UserObject Wrapper {
    public HumanObjectWrapper(Object arg0) {
        super(arg0);
    }
    public String toString( ) {
        if (_object != null && _object instanceof Human) {
            Human human = (Human)_object;
            return "Name=" + human.getName( )
                +";Age=" + human.getAge( );
        } else {
            return _object == null ? "null" : _object.toString( );
        }
    }
}
```

For this example, for the parameter type "class com.yysoft-.Jback.demo.entity.Human", the parameter value returned without the plugin is "com.yysoft.Jback.demo.entity.Human @15a6029." On the other hand, if the plugin is used, the parameter value returned is "Name=Jordan; Age=42." The plugin code 228 is dynamically linked into, and executed from data collection program 224. As shown in this example, the insertion of application-specific code 228 into the software data collection program 224 provides more complete information and understanding about what defective program 222 is doing.

In some embodiments, a file with log data 230 may also include information from configuration file 226, such as information identifying the product, the support provider for the product and related people. Table 3 shows an exemplary file of log data 230, including application-specific log data 234, from defective program 222.

TABLE 3

A file of log data, including application-specific log data

```
<JBack version="0.1">
    <Company
        CompanyName=" ABC-Provider"
        . . ./>
    <Product
        ProductName="ABC-Program"
```

TABLE 3-continued

A file of log data, including application-specific log data

```
        ProductVersion="1.0"
        ProductWebsite="http://www.ABC-Provider.com"/>
    <EmailList>
        <EmailItem>. . .</EmailItem>
        <EmailItem>User1@ ABC-Provider.com</EmailItem>
        <EmailItem>. . .</EmailItem>
    </EmailList>
    <Jback-log-data>
        <!--HTTP Request -->
        <entry tag="4" TimeStamp="1"
HttpRequest="http://www.sample.com/ERP/index.jsp"
        LocalPath="SessionID=60956904583455/1.http-req">
        </entry>
        <!--Method entry-->
        <entry tag="2" TimeStamp="3"
PackageName="com.yysoft.JBack.demo.entity"
            ClassName="God" MethodName="createMale"
            MethodSignature="class java.lang.String,int,"
            ReturnType="com.yysoft.JBack.demo.entity.Human"
            ReturnValue="null">
            <param type="class java.lang.String"/>
            <param type="int"/>
        </entry>
        ...
        ...
        <!--application-specific log from customer program -->
        <entry tag="10" TimeStamp="78">
            <item>
DEBUG Thread-0 JMCT_for_Eclipse.service.RMIService -
RMIService.startService
DEBUG Thread-0 JMCT_for_Eclipse.service.RMIService -
//localhost/EclipseService
        ...
        ...
            </item>
        </entry>
        ...
        ...
    </JBack-log-data>
</JBack>
```

Figure 3:
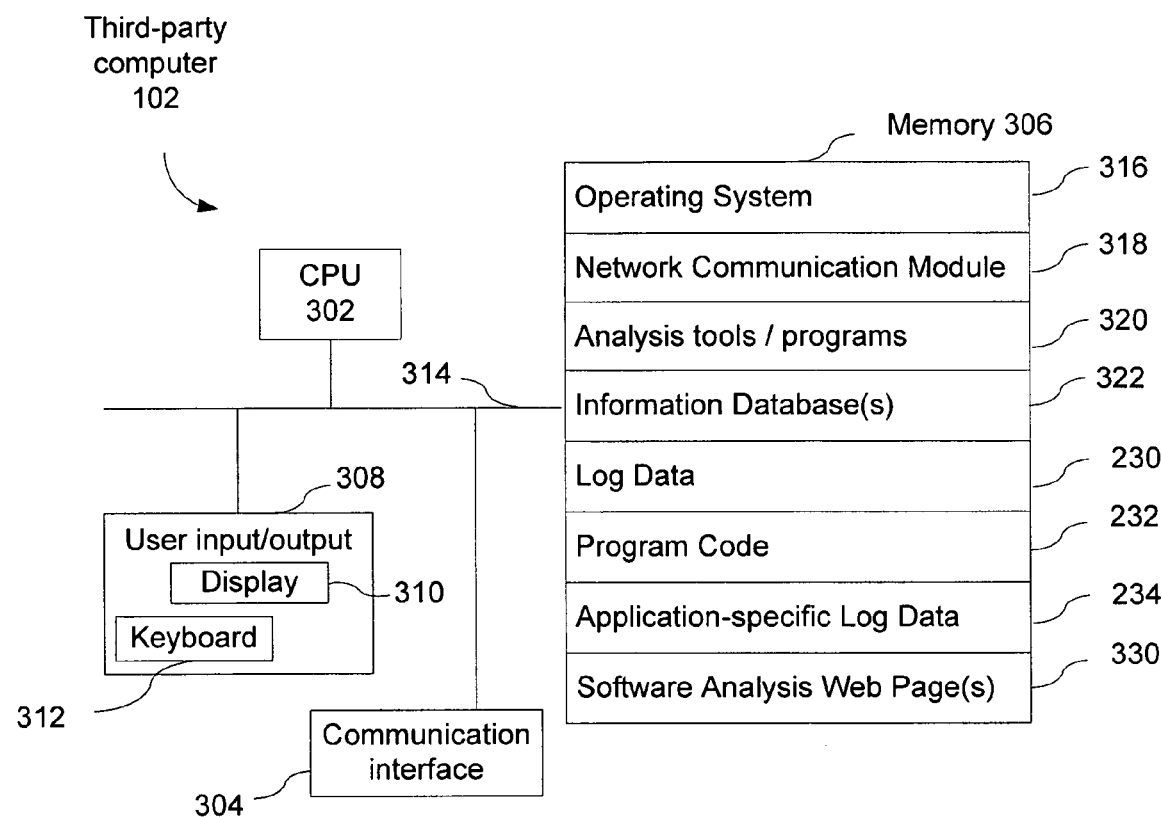
FIG. 3 is a block diagram illustrating a third-party computer in accordance with one embodiment of the present invention.

FIG. 3 is a block diagram illustrating third-party computer 102 in accordance with one embodiment of the present invention. The aspects of FIG. 3 that are analogous to those in FIG. 2 are not described again here. The memory 306 in third-party computer 102 stores the following programs, modules and data structures, or a subset or superset thereof:

an operating system 316, analogous to operating system 216 described above;

a communication module 318, analogous to network communication module 218 described above;

analysis tools/programs 320 that provide analysis of the log data 230, program code 232, and application-specific log information 234 sent to the third-party computer 102 by (or on behalf of) customer computer 104;

information database(s) 322 that store, for example, the log data 230, compiled and/or decompiled program code 232, application-specific log data 234, and analysis results created by analysis tools 320 for one or more defective software programs 222 on one or more customer computers 104; and one or more web pages 330 produced by or containing information (e.g., reports indicative of software errors, or data that may assist a computer programmer in determining the specific defect or defects causing the defective software program 222 to malfunction) produced by analysis tools/programs 320.

Figure 4:
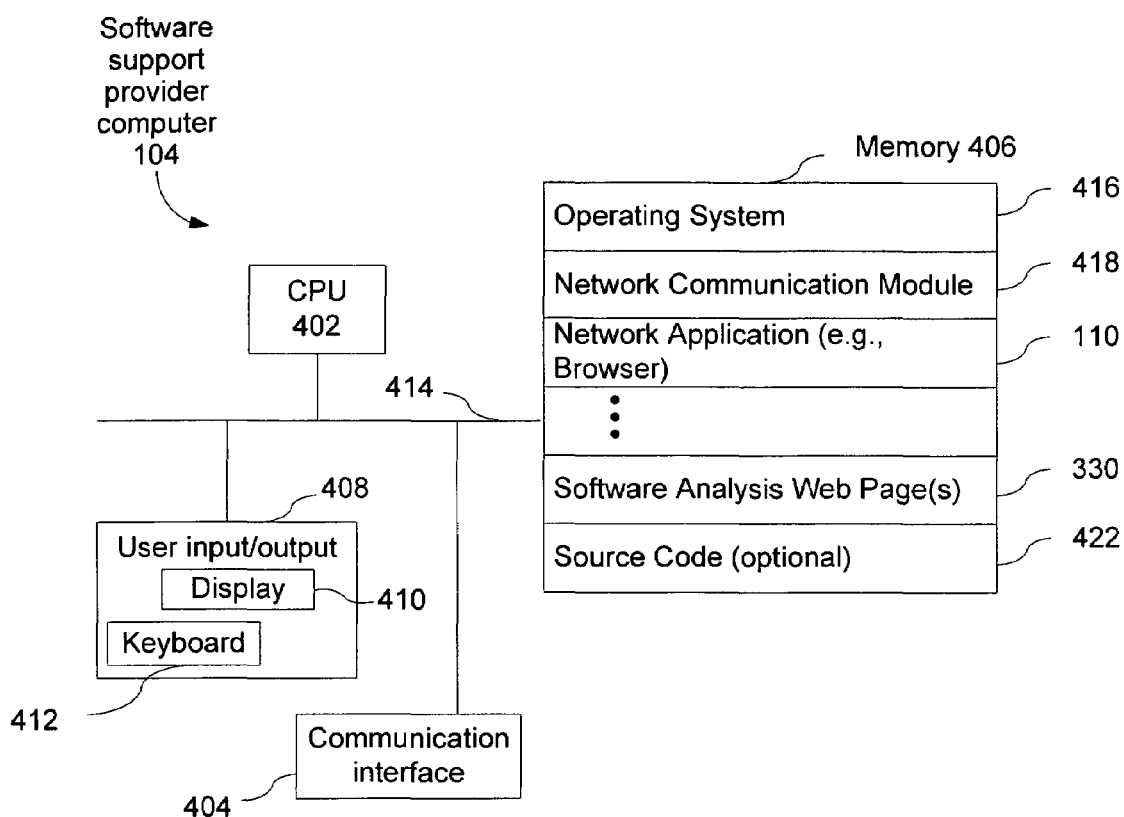
FIG. 4 is a block diagram illustrating a software support provider computer in accordance with one embodiment of the present invention.

FIG. 4 is a block diagram illustrating software support provider computer 106 in accordance with one embodiment of the present invention. The aspects of FIG. 4 that are analogous to those in FIG. 2 are not described again here. The memory 406 in software support provider computer 106 stores the following programs, modules and data structures, or a subset or superset thereof:

an operating system 416, analogous to operating system 216 described above;

a communication module 418, analogous to network communication module 218 described above;

a network application 110 that enables a software support provider (e.g., the software developer, an entity authorized by the software developer to provide support for the defective software program, or any other party that provides support/maintenance for defective software program 222) to analyze and debug defective software program 222 by directing the application of analysis tools/programs 320 at third-party computer 102 to the log data 230, program code 232, and/or application-specific log data 234 received at third-party computer 102;

one or more of the aforementioned web pages 330 produced by or containing information produced by analysis tools/programs 320 at third-party computer 102; and optionally, source code 422, corresponding to all or portions of the defective software program 222. For clarity, original source code 422 is different from decompiled program code 232.

Referring to FIGS. 2-4, each of the above identified modules and applications corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 206, 306, or 406 may store a subset of the modules and data structures identified above. Furthermore, memory 206, 306, or 406 may store additional modules and data structures not described above.

Although FIGS. 2-4 show computers 102, 104, and 106 as a number of discrete items, FIGS. 2-4 are intended more as functional descriptions of the various features that may be present in computers 102, 104, and 106, rather than as a structural schematic of the embodiments described herein. In practice, and as recognized by those of ordinary skill in the art, items shown separately could be combined and some items could be separated. For example, some items shown separately in FIGS. 2-4 could be implemented on single computers and single items could be implemented by one or more computers. The actual number of computers used to implement third-party computer 102, or software support provider computer 104 and how features are allocated among those computers will vary from one implementation to another, and may depend in part on the amount of data traffic that the third-party computer system or software support provider computer system must handle during peak usage periods as well as during average usage periods.

Figure 5A:
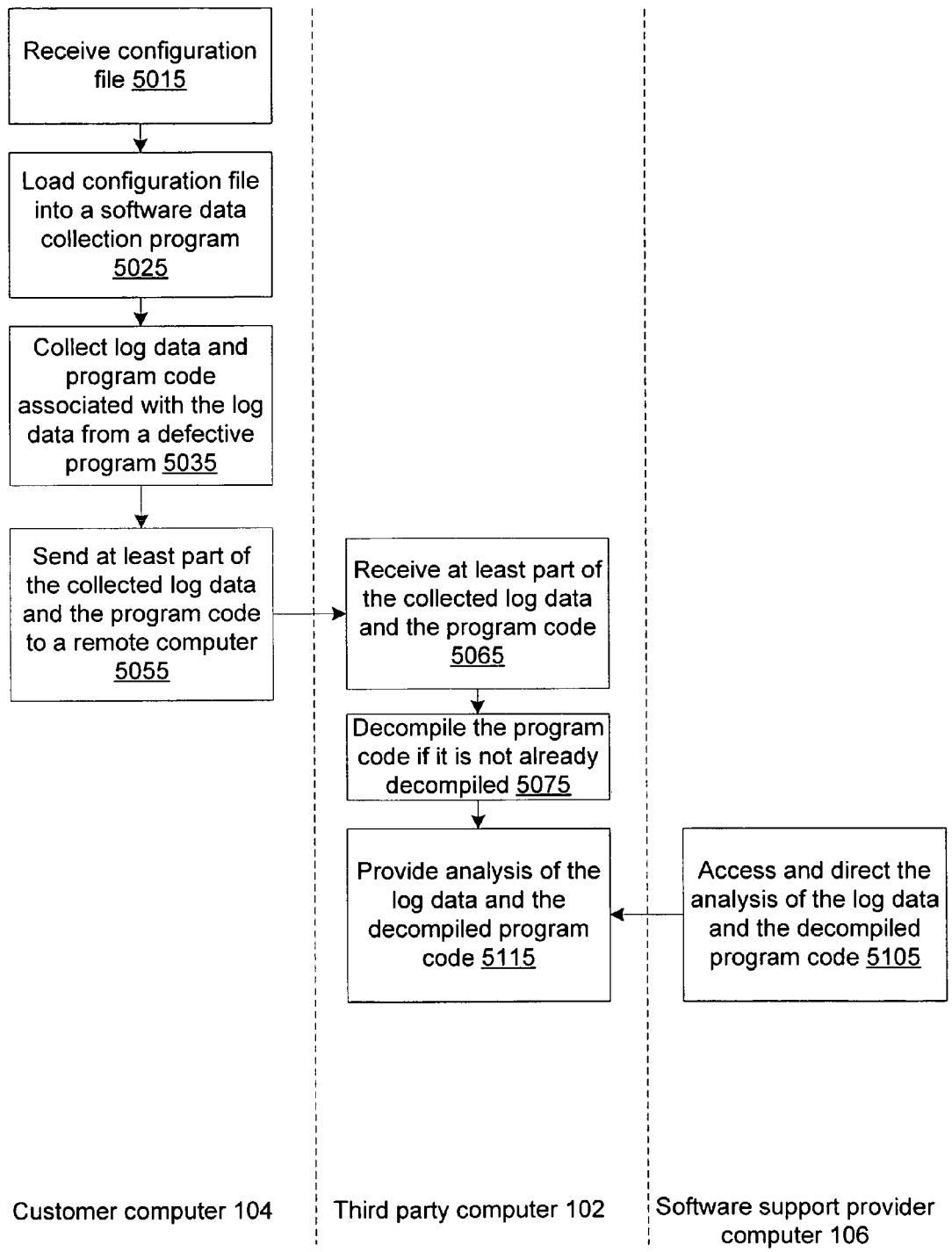
FIG. 5A is a flowchart representing a web-based method of analyzing a defective computer program according to one embodiment of the present invention.
Figure 5B:
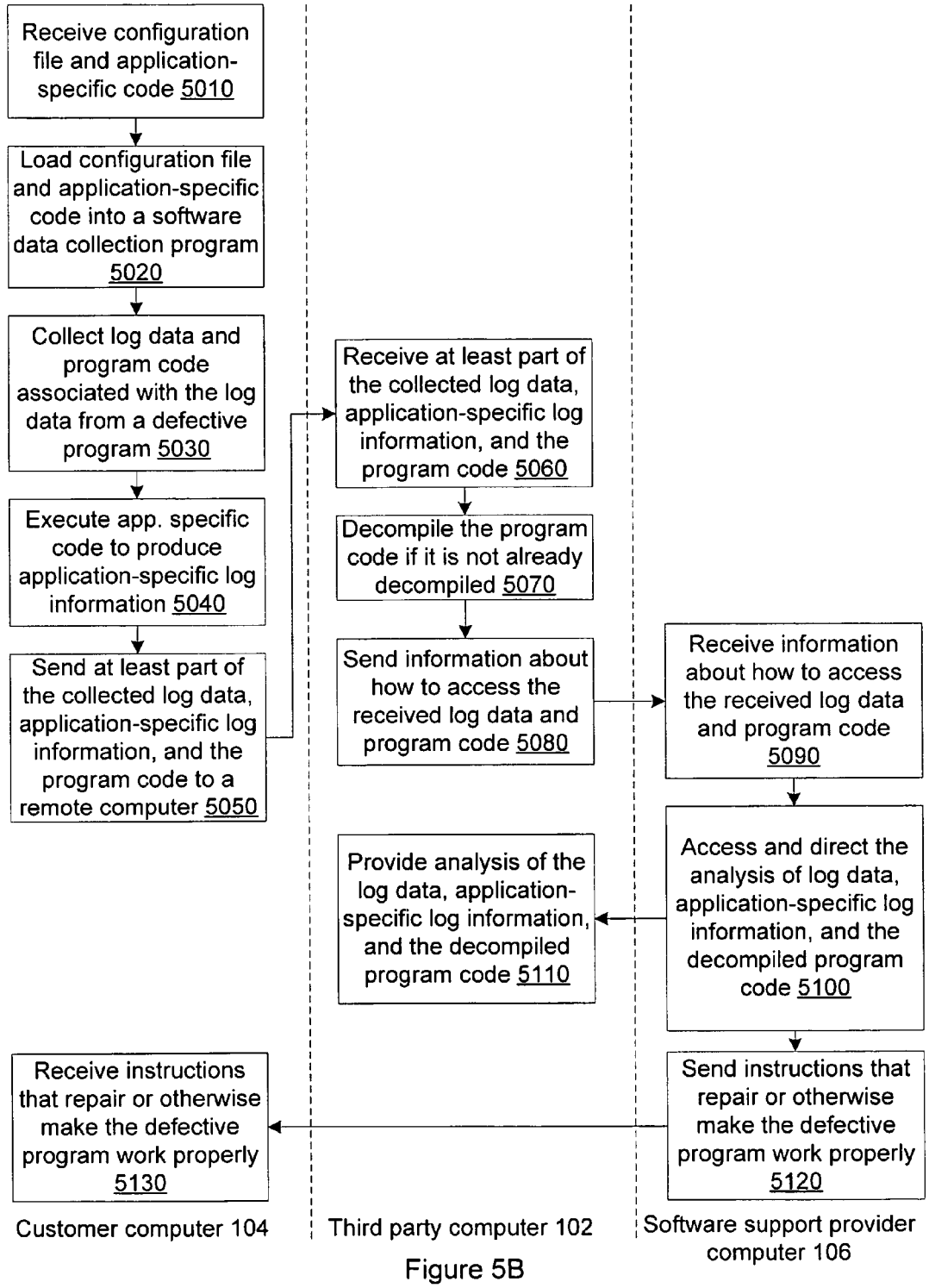
FIG. 5B is a flowchart representing a web-based method of analyzing a defective computer program according to another embodiment of the present invention.

FIGS. 5A and 5B contain flowcharts representing web-based methods of analyzing defective computer programs according to two embodiments of the present invention. It will be appreciated by those of ordinary skill in the art that one or more of the acts described may be performed by hardware, software, or a combination thereof, as may be embodied in one or more computing systems.

Customer computer 104 receives configuration file 226 (5015, 5010). In some embodiments, customer computer 104 also receives application-specific executable code 228 (5010). In some embodiments, configuration file 226 and application-specific executable code 228 are sent to customer computer 104 by software support provider computer 106 (e.g., in response to a message from customer computer 104 to software support provider computer 106 that program 222 is not working properly).

Customer computer 104 loads configuration file 226 into software data collection program 224 (5025, 5020). In some embodiments, application-specific code 228 is also loaded into software data collection program 224 (5020).

Using software data collection program 224, customer computer 104 collects log data 230 and program code 232 associated with the log data from defective program 222 on customer computer 104 (5035, 5030).

In some embodiments, customer computer 104 executes application-specific code 228 to produce application-specific log information 234 from defective program 222 (5040). In some embodiments, customer computer 104 executes application-specific code 228 to extract application-specific log information 234 from defective program 222. The production of application-specific log information 234 (5040) is typically done concurrent with the collection of log data 230 and program code 232 (5030).

In some embodiments, software data collection program 224 also collects http requests and responses (e.g., web pages, emails, and/or xml messages).

In some embodiments, software data collection program 224 uses well-known callback mechanisms to initiate data collection when one of the following events occurs: (1) program 222 execution reaches a point to be monitored, or (2) program 222 execution reaches an http request or response (e.g., a web page request/response, an outgoing email "send" method, or an http request/response to transmit xml content).

In some embodiments, when program 222 execution reaches a point to be monitored, software data collection program 224 records the fact that this execution point was reached. If required by configuration file 226, data collection program 224 also records the program 222 stack at this execution point. Data collection program 224 logs the data related to this execution point. If the execution point is a method entry or exit, data collection program 224 logs it as an "entry" or "exit" accordingly. Data collection program 224 retrieves (from program 222) and stores program code 232 corresponding to the smallest unit object module that contains the execution point. For example, for programs written in Java, the smallest unit object module is a Java class file. In some embodiments, a dynamic linker can be customized to retrieve and store binary program code 232. For example, for programs written in Java, a custom class loader can be written that modifies the class loading mechanism. The custom class loader writes out the in-memory image of the smallest unit object module at class-loading time if this module contains at least one monitored execution point.

In some embodiments, when program 222 execution reaches a point to be monitored, software data collection program 224 records the fact that this execution point was reached. If required by configuration file 226, application-specific code 228 is executed by data collection program 224, e.g., through dynamic linking. If there is any application-specific data at this point, data collection program 224 logs the content of application-specific log data 234. Data collection program 224 retrieves (from program 222) and stores program code 232 corresponding to the smallest unit object module for this execution point.

In some embodiments, when program 222 execution reaches an http request or response (e.g., in an application program interface, API, of the program 222), data collection program 224 records the fact that this execution point was reached. If required by configuration file 226, data collection program 224 also records the program stack at this execution point. If the execution point is a request or response, data collection program 224 records it as an "entry" or "exit", respectively (which marks the "boundary" of this transaction). If the execution point is a request, data collection program 224 logs the data content of the incoming transmission by monitoring the corresponding API (application program interface). If the execution point is a response, data collection program 224 logs the data content of the outgoing transmission by monitoring the corresponding API. For both requests and responses, logging (sometimes also called tracing) does not affect the actual data content being transmitted. Data collection program 224 retrieves (from program 222) and stores program code 232 corresponding to the smallest unit object module for this execution point.

In some embodiments, at regular intervals or upon receiving a user request, data collection program 224 places log data 230, program code 232, and application-specific log information 234 into a message folder 236 in a permanent storage device (e.g., a disk drive). In some embodiments, message folder 236 can be packaged into a single file for transmission to third-party computer 102.

Customer computer 104 sends at least part of collected log data 230 and program code 232 to a remote computer 102 that is separate from computers 106 controlled by a support provider for the defective program (5055, 5050). In some embodiments, customer computer 104 also sends at least part of application-specific log information 234 to remote computer 102 (5050). In some embodiments (not shown in FIG. 5), customer computer 104 decompiles program code 232 and then sends at least part of the decompiled program code to remote computer 102.

Figure 6:
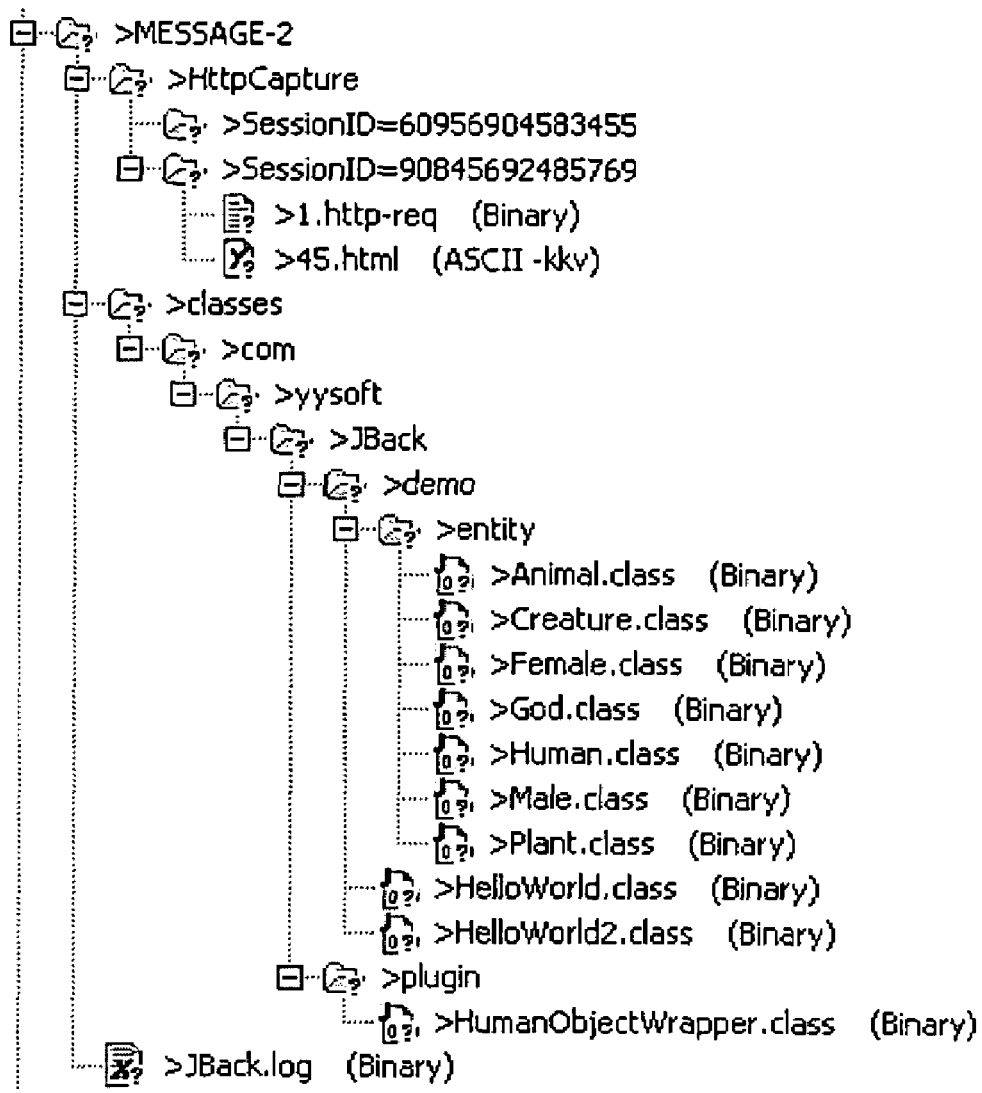
FIG. 6 shows the contents of an exemplary message folder.

FIG. 6 shows the contents of an exemplary message folder 236, including collected log data 230 (see ">Jback.log" in FIG. 6), program code 232 (see ">classes" in FIG. 6), and captured web pages (see ">HttpCapture" in FIG. 6). In some embodiments, message folder 236 includes application specific log data 234 as part of the collected log data 230.

Remote, third-party computer 102 is configured to provide analysis of the sent collected log data 230 and program code 232 to a network application (e.g., network application 110 on software support provider computer 106) in communication with the remote computer 102. In some embodiments, remote computer 102 is also configured to provide analysis of sent application-specific log information 234 to a network application (e.g., network application 110 on software support provider computer 106) in communication with remote computer 102. The analysis provided by remote computer 102 helps identify one or more defects in defective program 222.

Remote, third-party computer 102 receives log data 230 and program code 232 associated with the log data that was collected from defective program 222 on customer computer 104 (5065, 5060). In some embodiments, third-party computer 102 also receives application-specific log information 234 that was produced by executing application-specific code 228 on customer computer 104 to extract application-specific information from defective program 222 (5060).

Third-party computer 102 decompiles program code 232 if it is not already decompiled (5075, 5070). As noted above, in some embodiments (not shown in FIG. 5), program code 232 is decompiled by customer computer 104 (rather than third-party computer 102) and at least part of the decompiled program code is sent by customer computer 104 to a remote computer 102 that is separate from computers 106 controlled by a support provider for the defective program.

In some embodiments, third-party computer 102 sends information about how to access the received log data 230 and program code 232 at third-party computer 102 to a computer 106 in the set of computers associated with the support provider for the defective software (5080). In some embodiments, the information about how to access log data and program code at the third-party computer is contained in an electronic message (e.g., a message sent to a user of computer 106) that includes a unique identifier in the body of the message). In some embodiments, the unique identifier is a uniform resource locator (URL) address that will take a network application (e.g., browser 110 on software support provider computer 106, or browser 120 on client computer 118) to a web site or page where the log data 230, program code 232, and (optionally) application-specific log data 234 from defective program 222 can be analyzed (e.g., with analysis tools/programs 320). Table 4 is an exemplary electronic message.

TABLE 4

An exemplary electronic message with a unique identifier

Hi ***,
(This mail is automatically generated by JBack(tm) system.)
Here is a case related to you:
http://www.jback.com/case.do?id=companyname_productname_productversion_234523456780343
This case is from *CompanyName*'s *ProductName*-*VersionName*.
Other related people:
bill                                    - bill@jback.com
gerald                                  - gerald@jback.com
Richard                                 - Richard@foo.com
Documentation regarding JBack(tm) may be found in the Site Docs section of the site:
http://www.jback.com/docs/
Best wishes,
JBack(tm) system Third-party computer 102 provides analysis of received log data 230 and decompiled program code 232 to a network application (e.g., network application 110 on software support provider computer 106) in communication with third-party computer 102 to help identify one or more defects in defective program 222 (5115, 5110). In some embodiments, third-party computer 102 also provides analysis of application-specific log information 234 to a network application in communication with third-party computer 102 to help identify one or more defects in defective program 222 (5110).

Figure 8:
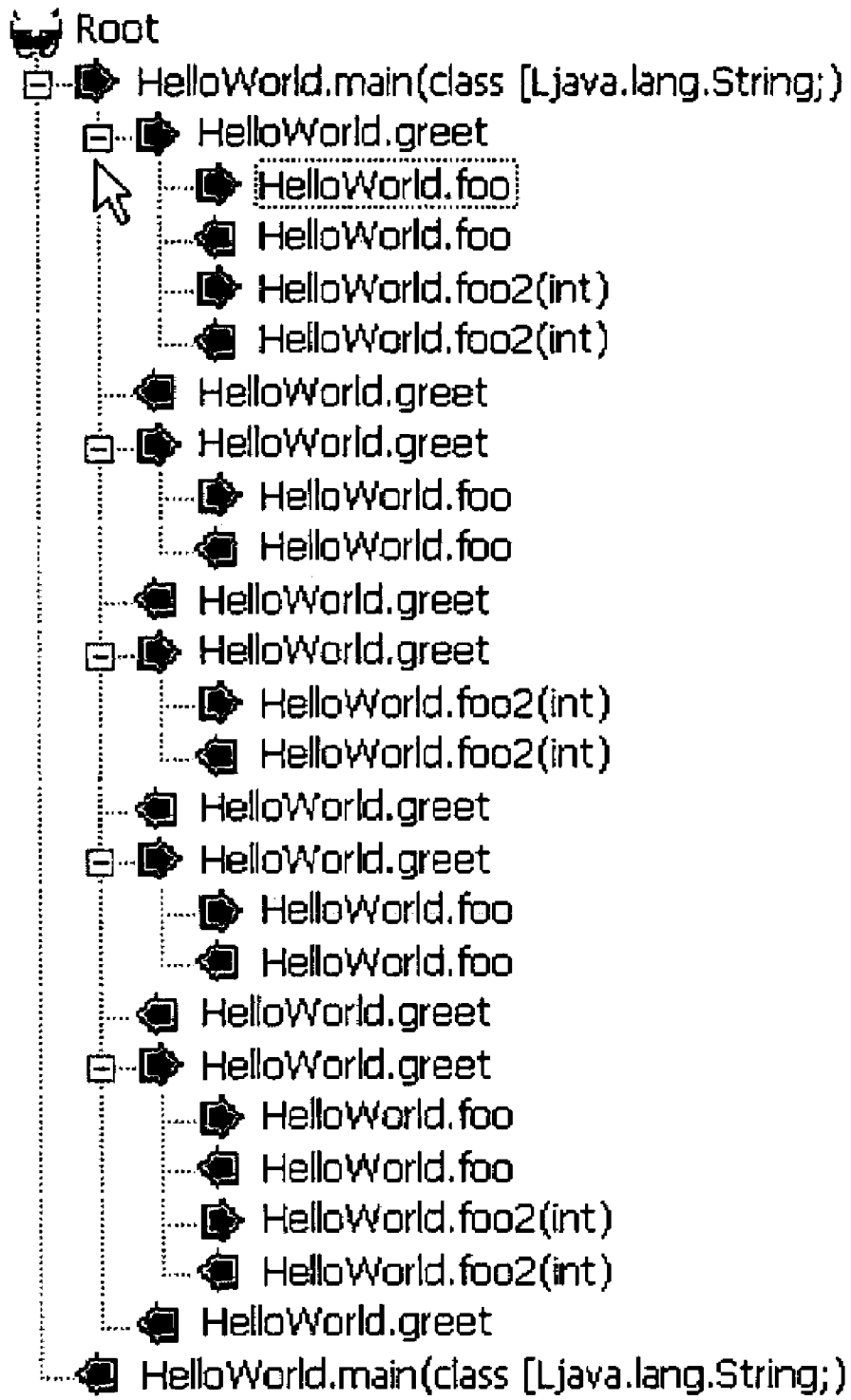
FIG. 8 shows a tree structure created from the unstructured log data shown in FIG. 7.

In some embodiments, the received log data 230 is linear or unstructured data that shows the chronological relationship between events that occurred during the execution of defective program 222 (FIG. 7). Such unstructured data 230 is difficult to read and manipulate. In some embodiments, log data 230 is put into a more structured format, such as a tree. Table 5 shows an exemplary algorithm for transforming linear log data 230 into a structured tree form. FIG. 8 shows the tree structure created by applying the algorithm in Table 5 to the data in FIG. 7.

TABLE 5

Algorithm to create a tree structure from linear log data

1. Create an empty tree object
2. Read a datum from log 230
3. If the datum is an "entry" datum, do the following:
   a) push datum into stack S
   b) add datum at the current tree level as one node
   c) set current tree level to one below the datum
4. If the datum is an "exit" datum, do the following:
   a) match the datum to the one at the top of stack S, flag an error if the two do not match
   b) pop datum from stack S
   c) set current tree level to one above the current level
   d) add datum at the current tree level as one node
5. If the datum is a "neutral" datum, do the following:
   a) add datum at the current tree level as one node
6. If the datum is an http request or http response datum, associate the node with the corresponding data file from the log data; otherwise, associate the node with its corresponding location in the corresponding decompiled class file In some embodiments, software support provider computer 106, which is associated with the support provider for defective software 222 and remote from a third-party computer 102, receives information about how to access log data 230, program code 232, and (optionally) application-specific log data 234 at third-party computer 102 (5090). In some embodiments, the received information is an electronic message with a unique identifier. In some embodiments, the electronic message with a unique identifier is received from third-party computer 102. In some embodiments, software support provider computer 106 is also remote from customer computer 104.

Software support provider computer 106 accesses and directs the analysis of log data 230 and program code 232 at third-party computer 102 (5105, 5100). In some embodiments, third-party computer 102 automatically decompiles program code 232 (FIG. 3), without prompting by the user of the software support provider computer 106. In other embodiments, the user of the software support provider computer 106 must initiate decompiling of program code 232. In other embodiments, customer computer 104, rather than third-party computer 102, decompiles program code 232. In some embodiments, software support provider computer 106 also accesses and directs the analysis of application-specific log information 234 at third-party computer 102 (5100). As described above, software data collection program 224 on customer computer 104 collects log data 230, application-specific log information 234, and program code 232 from defective program 222 on customer computer 104.

In some embodiments, software support provider computer 106 accesses analysis tools 320 on third-party computer 102 to direct the analysis of log data 230 and program code 232. For instance, a user of the software support provider computer 106 may use network application 110 to access those tools; to cause the remote computer 102 to perform analysis of log data 230 and program code 232; and to receive corresponding results. In some embodiments, network application 110 is a web browser and the results of the analysis are contained in one or more web pages 330 that are sent from third-party computer 102 to software support provider computer 106.

In some embodiments, after the software support provider determines the defects in defective program 222 and how to make defective program 222 work properly (e.g., by fixing, removing, or working around one or more defects), software support provider computer 106 sends (5120) and customer computer 104 receives (5130) instructions (e.g., software patches) that repair or otherwise make defective program 222 work properly.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving a configuration file at a customer computer;
receiving application-specific executable code;
loading the configuration file into a software data collection program on the customer computer;
using the software data collection program, collecting log data and program code associated with the log data from a defective program on the customer computer;
executing the application-specific code to produce application-specific log information from the defective program;
sending at least part of the collected log data, the application-specific log information, and the program code to a remote computer that is separate from computers controlled by a support provider for the defective program, wherein the remote computer is configured to provide analysis of the sent collected log data, the application-specific log information, and the program code to a network application in communication with the remote computer; and
receiving instructions that make the defective program work properly.

2. A method, comprising:
receiving a configuration file at a customer computer;
loading the configuration file into a software data collection program on the customer computer;
using the software data collection program, collecting log data and program code associated with the log data from a defective program on the customer computer; and sending at least part of the collected log data and the program code to a remote computer that is separate from computers controlled by a support provider for the defective program, wherein the remote computer is configured to provide analysis of the sent collected log data and the program code to a network application in communication with the remote computer.

3. The method of claim 2, including receiving instructions that make the defective program work properly.

4. The method of claim 2, including:
receiving application-specific executable code;
executing the application-specific code to produce application-specific log information; and
sending at least part of the application-specific log information to the remote computer.

5. The method of claim 4, including loading the application-specific code into the software data collection program.

6. The method of claim 4, including executing the application-specific code to extract application-specific information from the defective program.

7. The method of claim 2, wherein the analysis provided by the remote computer helps identify one or more defects in the defective program.

8. The method of claim 2, including decompiling the program code prior to sending at least part of the decompiled program code to a remote computer.

9. A system comprising a customer computer, wherein the customer computer is configured to:
receive a configuration file;
load the configuration file into a software data collection program on the customer computer;
using the software data collection program, collect log data and program code associated with the log data from a defective program on the customer computer; and
send at least part of the collected log data and the program code to a remote computer that is separate from computers controlled by a support provider for the defective program, wherein the remote computer is configured to provide analysis of the sent collected log data and the program code to a network application in communication with the remote computer.

10. A method, comprising:
at a third-party computer remote from a customer computer with a defective program and remote from a set of computers associated with a support provider for the defective program;
receiving log data and program code associated with the log data that was collected from the defective program on the customer computer;
decompiling the program code if the program code is not already decompiled; and
providing analysis of the received log data and the decompiled program code to a network application in communication with the third-party computer.

11. The method of claim 10, including sending information about how to access the received log data and program code to a computer in the set of computers associated with the support provider for the defective program.

12. A system comprising at least one third-party computer remote from a customer computer with a defective program and remote from a set of computers associated with a support provider for the defective program, wherein the at least one third-party computer is configured to:
receive log data and program code associated with the log data that was collected from the defective program on the customer computer;
decompile the program code if the program code is not already decompiled; and
provide analysis of the received log data and the decompiled program code to a network application in communication with the third-party computer.

13. A machine readable medium having stored thereon data representing sequences of instructions, which when executed by a third-party computer remote from a customer computer with a defective program and remote from a set of computers associated with a support provider for the defective program, cause the third-party computer to:
receive log data and program code associated with the log data that was collected from the defective program on the customer computer;
decompile the program code if the program code is not already decompiled; and
provide analysis of the received log data and the decompiled program code to a network application in communication with the third-party computer.

14. A method, comprising:
at a computer associated with a support provider for a defective program remote from a third-party computer, using a network application to access and direct the analysis of log data and program code at the third-party computer, wherein a software analysis program on a customer computer collected the log data and the program code from the defective program on the customer computer.

15. The method of claim 14, including receiving information about how to access the log data and program code at the third-party computer.

16. The method of claim 15, wherein the information about how to access the log data and program code at the third-party computer is received from the third-party computer.

17. The method of claim 15, wherein the information about how to access log data and program code at the third-party computer is contained in an electronic message that includes a unique identifier in the body of the message.

18. The method of claim 14, including using the network application to access and direct the analysis of application-specific log information at the third-party computer, wherein the software analysis program on the customer computer collected the application-specific log information on the customer computer.

19. The method of claim 14, including accessing analysis tools on the third-party computer to analyze the log data and the program code.

20. The method of claim 14, including using the network application to cause the remote computer to perform analysis of the log data and the program code and to receive corresponding results.

* * * * *